United States Patent

[11] 3,591,000

| [72] | Inventor | Ira B. Humphreys<br>910 American National Bank Bldg.,<br>Denver, Colo. 80202 |
|---|---|---|
| [21] | Appl. No. | 871,452 |
| [22] | Filed | Oct. 27, 1969 |
| [45] | Patented | July 6, 1971<br>Continuation-in-part of application Ser. No. 697,166, Jan. 11, 1968, now abandoned. |

[54] METHOD AND APPARATUS FOR SIZING AND SEPARATING SOLIDS
8 Claims, 13 Drawing Figs.

[52] U.S. Cl. .................................................. 209/210, 209/157
[51] Int. Cl. .................................................. B03b 3/00
[50] Field of Search .................................................. 209/45, 115, 116, 136, 142—145, 155, 157, 208, 210, 439, 443, 458—460, 471, 483, 493; 210/65, 542

[56] References Cited
UNITED STATES PATENTS
| 2,542,095 | 2/1951 | Rouget ........................ | 209/144 |
| 2,902,154 | 9/1959 | Cannon ....................... | 209/493 X |

*Primary Examiner*—Frank W. Lutter
*Assistant Examiner*—Ralph J. Hill
*Attorney*—Pattison, Wright & Pattison ABSTRACT: A method and apparatus for sizing and separating solid particulates through utilization of the Coanda effect obtained by introducing a liquid slurry containing suspended solid particulates of differing sizes and shapes therein onto a torus or curvilinear surface to enable the particulates to separate out of the slurry stream as the same flows over the torus and collecting the particulates in different zones corresponding to their zones of discharge from the slurry with the larger particulates being collected at the greatest distance tangentially from the torus.

INVENTOR
IRA B. HUMPHREYS

BY
ATTORNEYS

INVENTOR
IRA B. HUMPHREYS

BY Patterson, Wright & Patterson

ATTORNEYS

INVENTOR
IRA B. HUMPHREYS

ATTORNEYS

METHOD AND APPARATUS FOR SIZING AND SEPARATING SOLIDS

This application is a continuation-in-part of application Ser. No. 697,166, filed Jan. 11, 1968 now abandoned.

The present invention relates to separating and sizing of solid particulates and more particularly and specifically to methods of and apparatus for separating and sizing solid particulates suspended in a liquid slurry and to collecting the particulates in accordance with their size.

Heretofore there have been many and various methods practiced and apparatus used for separating solid particulates into graded sizes in accordance with their size or configuration so that ore particulates would be available for various subsequent operations within given graded ranges. For example, it is often desirable and necessary in dealing with minerals to presize or grade ore particulates to permit selection of a certain range of ore particle sizes for subsequent processing. Particulates are graded by screening, centrifugal separation, mechanical hydraulic classification, and hydraulic classification.

It is an object of the present invention to disclose and make available certain recent discoveries relating to physical phenomena which enable the achievement of the separation of solid particulates in accordance with the size or configuration of the particulates.

It is another and principal object of the present invention to provide a process or method of sizing and separating solid particulates which is based upon certain physical phenomena which have heretofore been unrecognized as applicable to the field of separation.

Still another object of the present invention lies in the provision of apparatus capable of practicing a novel and unique method of separating and sizing solid particulates which is of extremely simple and inexpensive design and manufacture and which utilizes no moving or working parts but relies entirely on the application of newly discovered physical phenomena to obtain separation and classification of solids in accordance with their size or configuration when an admixture of solid particulates of differing sizes and shapes has been suspended in a liquid slurry for processing purposes.

It is a still further object and advantage of the present invention to provide a method of sizing and separating particulates by difference in particulate size or shape, and apparatus for practice of such a method, which is readily capable of and adaptable to separation of many and various forms and types and which is readily adaptable either for use as a final separating stage or for use in presizing apparatus in advance of other forms of final separating and sizing apparatus.

Another object and advantage of this invention lies in the provision of apparatus practicing a unique separating and sizing method which is capable of installation and operation in a series of stages to produce further separation of solid particulates of differing sizes and shapes.

An additional object and advantage of the present invention rests in the provision of a method and apparatus for sizing and separating particulates of different sizes and shapes suspended in a liquid slurry which is capable of definitive separation control through variations in the dimensioning of certain critical structural features of the apparatus, or by variations in certain characteristics of the processing steps.

Still other objects and advantages of the present invention will become readily apparent to those skilled in the art when the following general statement and detailed descriptions are read and considered in the light of the accompanying drawings.

The nature of the present invention may be stated in general terms as relating to a method of sizing and separating solid particulates of different sizes and shapes suspended in a liquid slurry through flowing of said slurry in a downward direction at a controlled rate over a curvilinear surface which may have the general configuration of a torus and collecting particulates generally tangentially of the curvilinear surface in graded collecting zones the positioning of which are determined by the points of discharge of particulates of different sizes and shapes from the flowing slurry, and through the use of apparatus designed to implement the step by step practice of the process or method defined.

Referring now to the accompanying drawings in which like numerals designate similar parts throughout the several views.

Prior to making specific reference to the appended drawings for purposes of specific understanding of the present invention, it should be borne in mind that the broad concepts of the present invention would appear to have many applications in the field of separation. For purposes of more fully and clearly understanding the invention, reference is made, by way of example only, to the adaptability of the present invention to use as a presizer for slurry-suspended ores to be introduced into concentrating spirals of the type shown and described in U.S. Letters Pat. Nos. 2,431,559 and 2,431,560, both issued Nov. 25, 1947, where the efficiency and effectiveness of the concentrating spirals is in part determined by a control exercised over the range of particulate sizes introduced thereinto in the liquid feed. Use of apparatus practicing the present invention and control of the function of such apparatus of the present invention will enable reasonably definitive control over the range of the particulate sizes and shapes introduced into the spiral concentrators above referenced.

By way of additional example, the present invention is particularly adaptable to complement or to replace screens which are extensively used in industry today for size control of the products of autogenous and rod mills and/or other types of grinding and crushing apparatus of the type commonly used in ore reduction plants. It is commonly known that the maintenance and upkeep of shaker screens is costly and time-consuming and the use of separating and sizing apparatus of the type subject of the present invention would greatly reduce the loss of operating time and maintenance costs of size control apparatus for ore grinding circuits.

For the purpose of clarity the description and disclosures herein contained include terminology intended to have meaning as follows:

Coanda effect—the tendency of a gaseous or liquid fluent stream to attach itself to and to adhere to and follow the contour of a curved surface.

torus—a smooth, convexlike surface.

I have discovered that when a liquid slurry having solid particulates of different sizes or of different configurations suspended therein is introduced as a stream onto a generally downwardly disposed curvilinear surface having convex characteristics, the particulates will separate from the liquid stream at different points or within different area zones along the curvilinear surface in accordance with the differing sizes or configurations of the particulates. I have further discovered that the radius of curvature of the surface and the rate of introduction of liquid onto the surface will, in part, determine the rate and effectiveness of the separation and the extent of sizing or grading of separated particulates.

Figure 1:
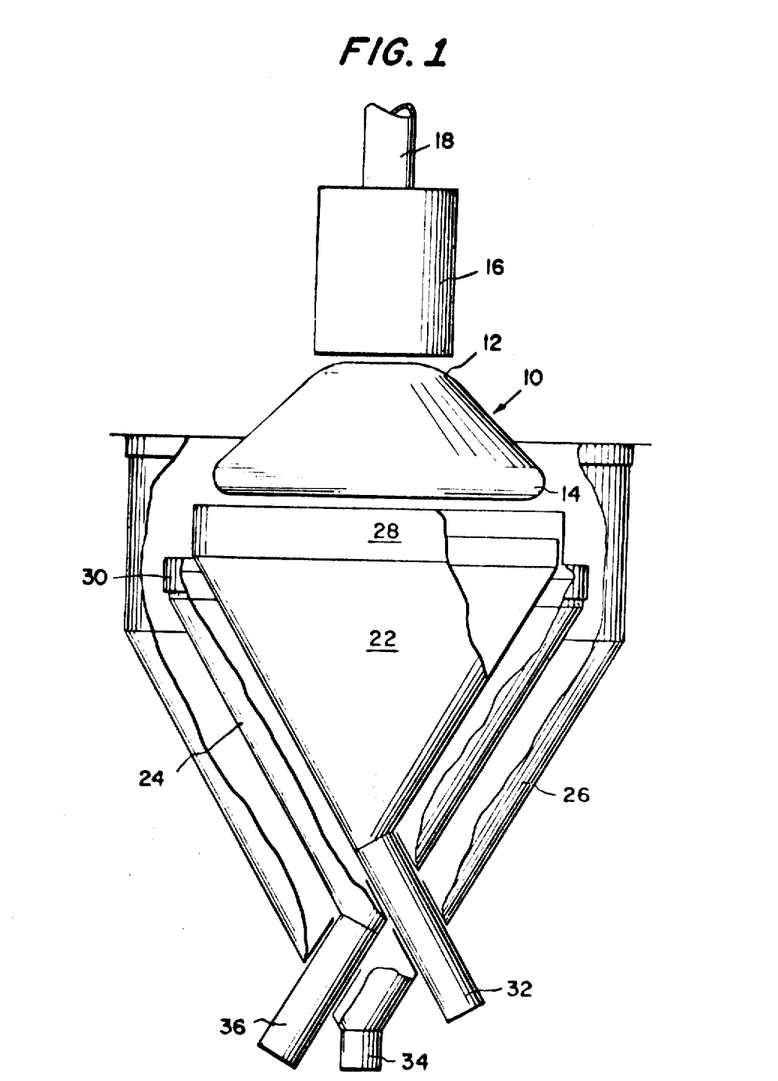
FIG. 1 is a side elevation of apparatus capable of practicing the method concepts of the present invention.
Figure 2:
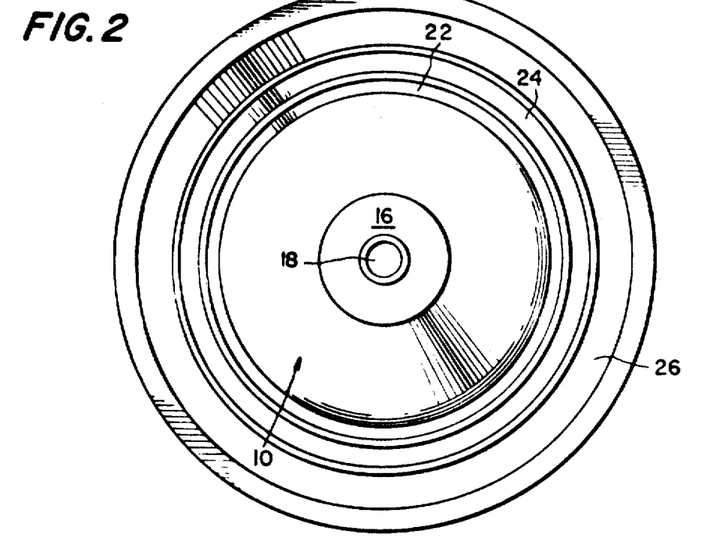
FIG. 2 is a top plan view of FIG. 1.
Figure 3:
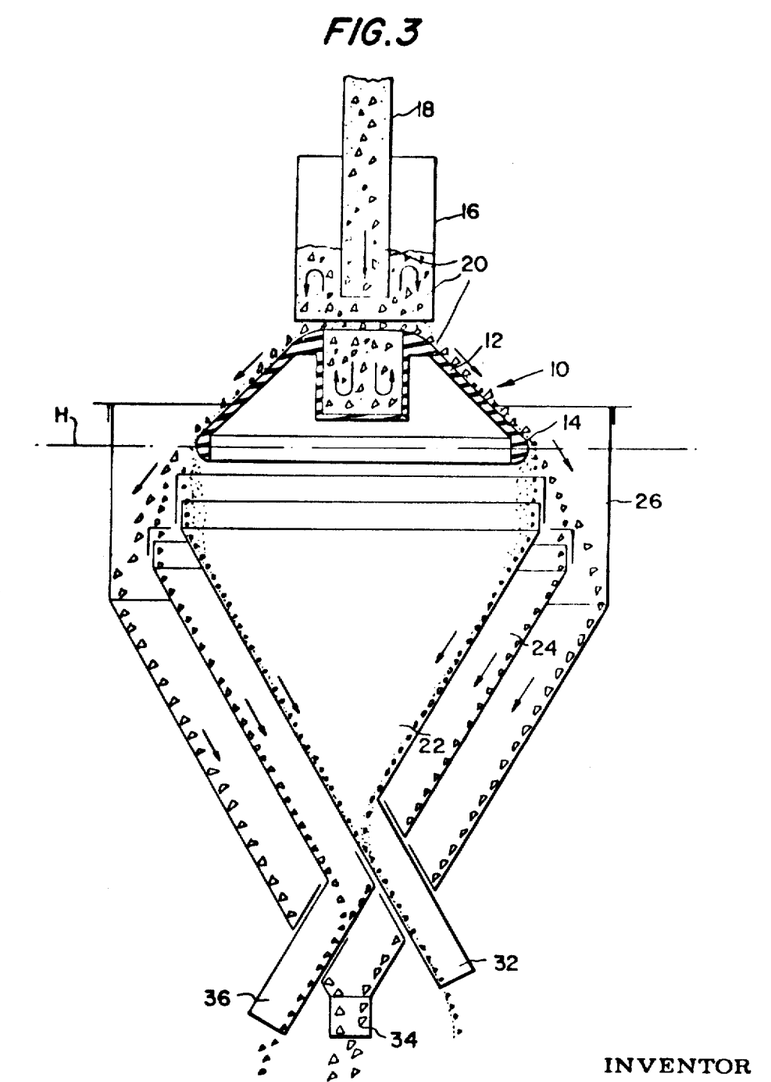
FIG. 3 is a side elevation of the apparatus of FIG. 1 including illustration of the slurry flow and particulate collection apparatus.

The accompanying drawings illustrate several forms of my invention and several variations in the means of attaining practice of my inventive concepts. In FIGS. 1—3 of the drawings, there is shown one embodiment of structure capable of producing a highly effective separation and sizing of solid particulates of different sizes and shapes suspended in a liquid slurry and of collecting such separated particulates in accordance with such separation.

In FIGS. 1, 2 and 3, a curvilinear surface 10 of circular form and having an upper end 12 and a lower end 14 is provided with a concentrically positioned feedwell 16 to which a feed slurry pipe 18 communicates downwardly. The feedwell 16 when correctly positioned causes the introduction of a circular stream of slurry 20 onto the curvilinear surface in a manner to produce equal flow downwardly and over the device. The slurry adheres to the curved surface of the device by reason of the Coanda effect. The apparatus is provided with collecting hoppers 22, 24 and 26, concentrically positioned about the curvilinear surface 10 and located so that adjustable splitters 28 and 30 can be brought into the most effective regions for splitting desired products from the discharge pattern established by the curvilinear surface. Mineral particulates of finer size or having a flat, flakey shape tend to discharge from spout 32. Coarser and larger particulates, rounded or blocky in shape, tend to accumulate in hopper 26, discharging from spout 34. A middling product from the zone of incomplete separation is collected in hopper 24 and discharged from spout 36.

With particular reference to FIG. 3, it is seen that a liquid slurry introduced through the feedwell onto the curvilinear surface will, by reason of the Coanda effect, tend to follow the curved surface of the device through the horizontal plane H and beyond.

It is further seen that larger solid particulates suspended in the slurry will separate out of the slurry and will be discharged outwardly away from the assembly for collection in hopper 26. Those particulates having the greatest size will be discharged first from the slurry tangentially of the curvilinear surface approximately at the point of tangency of surfaces 12 and 14, while the particulates of progressively lesser size will be discharged or released from the slurry at successive points along the curved surface toward the lowermost point therealong with the finest particulates being discharged most closely adjacent the lower terminus of the curvature. As is illustrated, the particulates, progressing from those having the greatest size to those having the least size, will be successively collected in the concentrically arranged hoppers from the outermost extremity thereof toward the innermost axis thereof.

FIGS. 4—8, inclusive, illustrate various modifications of the apparatus of FIGS. 1—3 capable of practicing the present invention with the modifications taking the form of variations in the configuration of the curvilinear surface or torus over which the slurry is directed for purposes of sizing and separating. In each modified form illustrated in FIGS. 4—8 the curvilinear surface 10 heretofor identified and described in the form of the invention shown in FIGS. 1—3 is changed to accomplish an increase or decrease in the pitch of the upper and/or lower surface of the assembly in advance of or following the torus area or in the radius of the torus.

Figure 4:
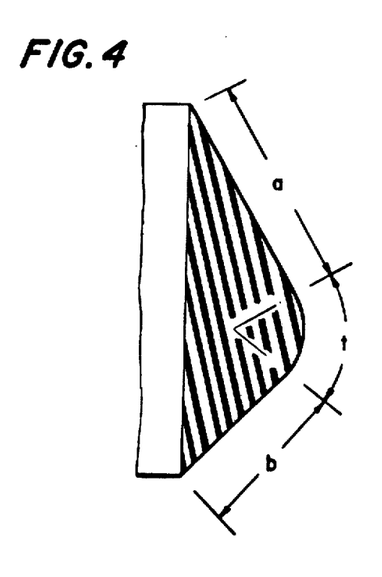
FIG. 4 is a partial vertical section of a modified form of the curvilinear surface or torus of the apparatus of FIG. 1.

For example, the modification disclosed in FIG. 4 of the drawings provides for an increased length and greater vertical pitch of the area designated $a$ above the torus area $t$ over which the slurry flows, with a corresponding decrease in the length of the surface $b$ below the torus extending to the lower extremity of the element. Apparatus embodying this modified configuration would manifestly provide for an increased slurry velocity in advance of the torus by reason of the increased vertical pitch of the surface above and in advance of the torus.

Figure 5:
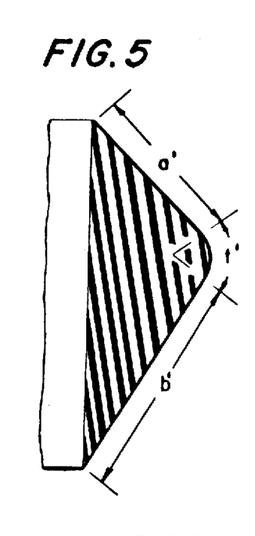
FIG. 5 is a partial vertical section of a modified form of the curvilinear surface or torus of the apparatus of FIG. 1.

The apparatus of FIG. 5 shows a converse modification to that described in respect to FIG. 4, wherein that portion $a'$ of the surface 10 above the torus $t'$ is shortened and the vertical pitch decreased with a corresponding lengthening of the surface $b'$ below the torus accompanied by an increase in the vertical pitch thereof. By this modification a decrease in the velocity of the slurry entering the torus is obtained.

Figure 6:
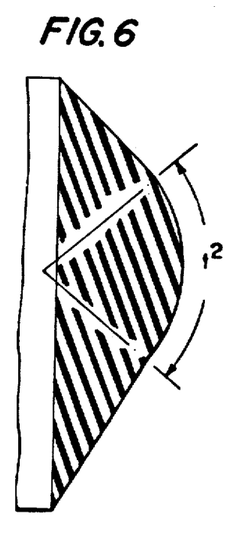
FIG. 6 is a partial vertical section of a modified form of the curvilinear surface or torus of the apparatus of FIG. 1.

In FIG. 6 there is seen another modification wherein the principal variation occurs as a result of substantially increasing the radius of the torus $t^2$, thereby increasing the surface length of the torus and simultaneously reducing the sharpness or definitiveness of the surface over which separation of particulates normally occurs in the area of the torus.

Figure 7:
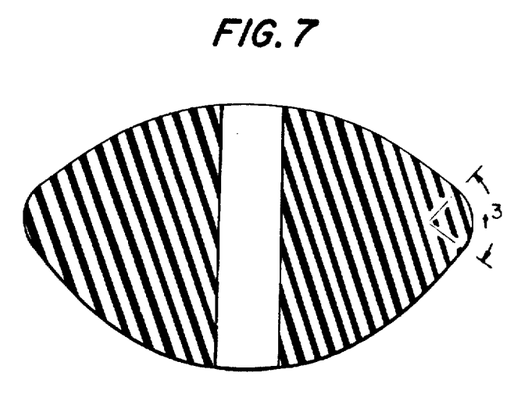
FIG. 7 is a partial vertical section of a modified form of the curvilinear surface or torus of the apparatus of FIG. 1.

FIG. 7 illustrates still another modification wherein the radius of the torus $t^3$ is decreased, the surface in advance of the torus $t^3$ is semispherical, and the surface below the torus rounded off from a radius point rather than extending as a straight line projection of the conical surface. Utilization of the apparatus conforming to the construction of FIG. 7 will bring about corresponding changes in function with those previously described.

Figure 8:
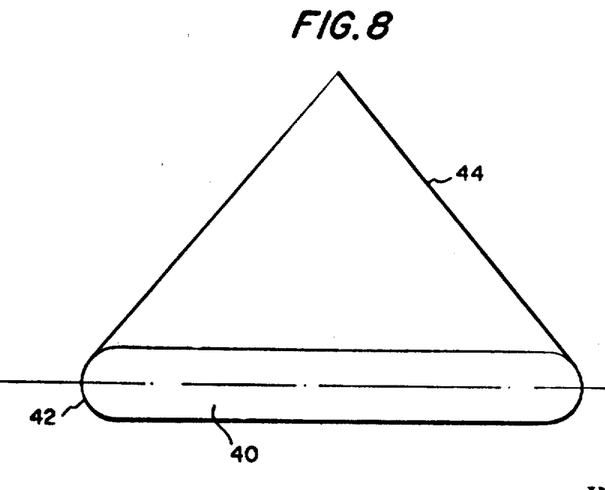
FIG. 8 is a partial vertical section of a modified form of the curvilinear surface or torus of the apparatus of FIG. 1.

In FIG. 8 of the drawings there is disclosed another form of the present invention consisting of a ring member 40 resembling a pneumatic tire innertube having an arcuate peripheral surface 42 forming the torus over which the slurry flows. Conical cap element 44 is disposed above the ring element 40 with the conical surface thereof forming a tangential extension of the torus surface of the ring element.

With continued reference to the form of the invention shown in FIG. 8, it has further been discovered that separation begins when centrifugal force acting upon the mineral particulates overcomes the surface tension tending to keep them in the slurry. The coarser particles protruding more from the thinning film of slurry are released earlier. Particulates of intermediate size or mass are released upon the development of more centrifugal force. Fine particulates remain entrapped in the slurry which tends to follow the curved surface by reason of the Coanda effect.

Figure 9:
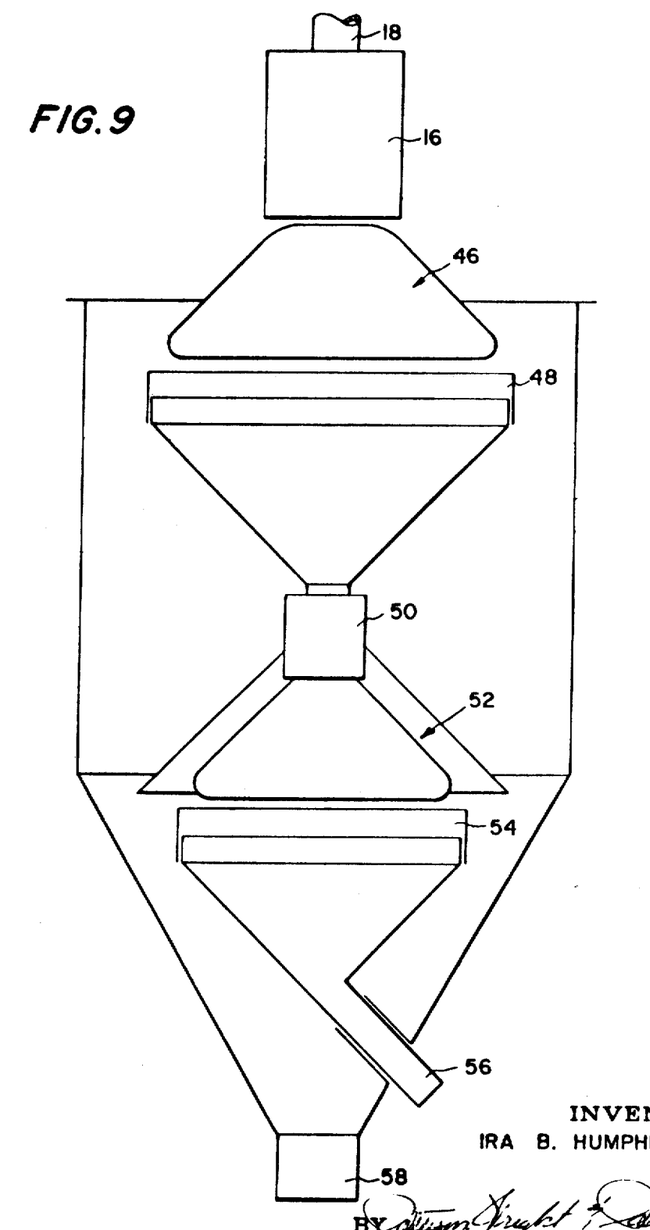
FIG. 9 is a schematic diagram of several devices of the form shown in FIG. 1 arranged in series.

FIG. 9 is merely for the purpose of illustrating the adaptability of the present apparatus to installation in series whereby a first stage 46 of the apparatus will separate out of the slurry introduced from the feed 18 particulates sized into certain preselected grades and in which the slurry recovered below the first stage 46, as at 48, which contains a high concentration of fine particulates, will be collected at 50 and subsequently subjected to a second stage 52 of apparatus herein described to size and separate the fine particulates into again selected grades for collection at 54 and discharge at 56. The number of units used in series will determine the different degrees of separation and sizing to be obtained and will determine the extent of removal of particulates from the slurry originally introduced into the first stage of the apparatus. Likewise, the coarser structured product falling to the outside of the collectors 48 and 54 may be collected at 58 for treatment in a second stage of sizing on a device of similar or modified design.

It should also be equally recognized that part of the slurry recovered from a single stage of the apparatus herein disclosed may be recirculated as middling to the feed side of the same stage for reprocessing or for supplementing the slurry being introduced into the single stage apparatus.

Figure 10:
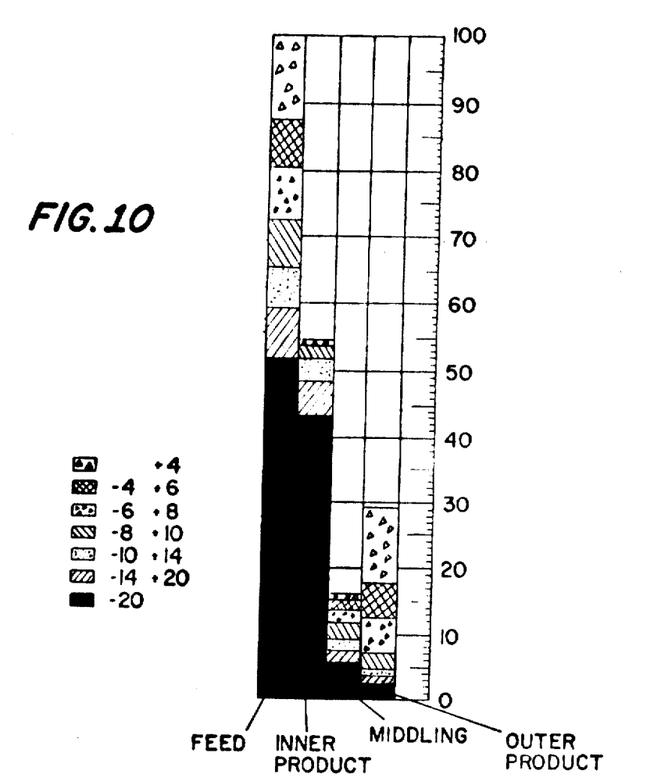
FIG. 10 is a graphic illustration of particulate separation achieved by test of the apparatus of the form of FIG. 1.

In FIG. 10, there is illustrated graphically the sizing and separation results obtained by feeding apparatus similar to FIG. 1 crushed ore of a typical size assemblage.

The unique and beneficial function of the apparatus hereinbefore described in separating and collecting particulates by their size and shape results to a substantial degree from the uniform diminution in the depth of the slurry stream which inherently occurs by flowing the stream downwardly over the fixed, inclined, circular surface of the element 10. The depth of the stream diminishes in direct response to the uniformly increasing surface area of the element 10 progressively from the upper apex portion thereof to the lower circumferential portion immediately in advance of the torus 14. An increase or decrease in the pitch of the upper and/or lower surface of the assembly in advance of the torus area will, as hereinbefore described, change the velocity of flow of the slurry stream which contributes in part to control the depth of the stream progressively of the inclined surface of the element 10, but the slurry depth is primarily controlled by the increase in surface area between the upper surface of the element 10 immediately below the point of feed and the lower surface area thereof immediately in advance of the torus.

It is, of course, important to the effective control of the separating method performed by the apparatus described that the inclined or sloping surface in advance of the torus take the continuous circular form herein described in order that there be no lateral obstruction to the flowing slurry stream whereby the stream seeks and establishes its own uniform level throughout the entire surface area. Side enclosures forming a sluice structure, or a like limitation or obstruction in the lateral direction of the slurry stream, would cause variations in stream depth in areas adjacent and remote to the stream contact with such obstructions, and would also create variations in stream velocity between said remote areas by reason of frictional contact of the stream with said lateral obstructions.

While variations and modifications might be made in the apparatus described, such as may be hereinafter suggested, optimum performance and result are obtained from the structure disclosed which incorporates the continuous, circular configuration of the elements or component portions 10, 12 and 14 of the structure disclosed in FIG. 1 of the drawings. The effective utilization of the Coanda effect is obtained to its maximum advantage from these specific configurations.

Figure 11:
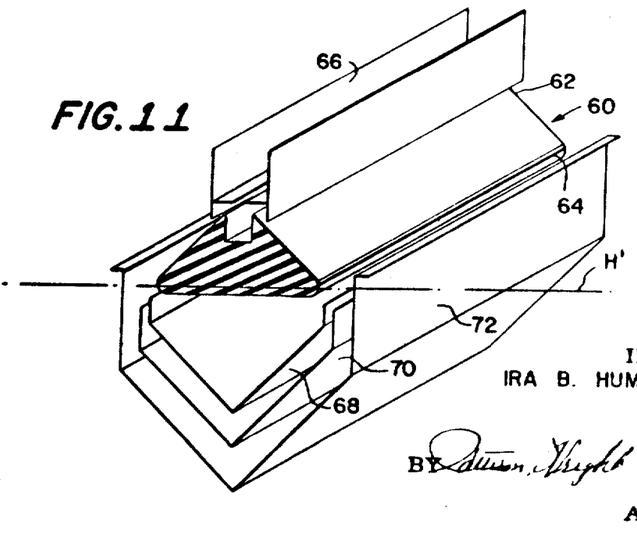
FIG. 11 is a pictorial view of a modified embodiment of the inventive concepts hereof.

In FIG. 11 of the drawings, there is illustrated a substantially modified form of apparatus which is capable of practicing substantially the same method of sizing and separation as that practiced by the forms of invention shown in FIGS. 1—9, inclusive. The construction of the form of apparatus disclosed in FIG. 11 is for the purpose of illustrating possible modifications which are contemplated by the broad general concepts of the invention disclosed and described herein.

In FIG. 11, there is illustrated a sizing and separating member 60 which takes the form of an elongated bar having a vertical cross-sectional configuration substantially identical to the cross-sectional configuration of the circular separating element 10 disclosed in the apparatus of FIGS. 1—9. This separating member, on each side thereof, has an upper end 62 and a lower end 64 forming a torus in the region of the horizontal plane generally defined at H'. An elongated feedwell 66 is positioned above the uppermost end 62 of the separating surface to discharge a uniform stream of liquid slurry downwardly over both inclined side surfaces of the bar member. Positioned longitudinally beneath the elongated bar member are a series of troughs 68, 70 and 72, the upper ends of which define collecting hoppers for the reception and retention of granular particulates of different coarseness and size as the same are divided by the separating action of the slurry in which said particulates are entrained passing over the torus of the separating bar. The particulates may be removed from the collecting hoppers by any one of several acceptable and conventional means.

This modification of the separating apparatus does not, throughout the lateral dimension of the sloping surface, obtain the same degree of effective control over slurry depth and velocity as is attained in the configurations hereinbefore disclosed and suggested wherein the surfaces are of continuous circular shape. However, a substantially successful result may be obtained from structure of the configuration disclosed in FIG. 11, particularly in the central areas laterally of the separating member 60.

Figure 12:
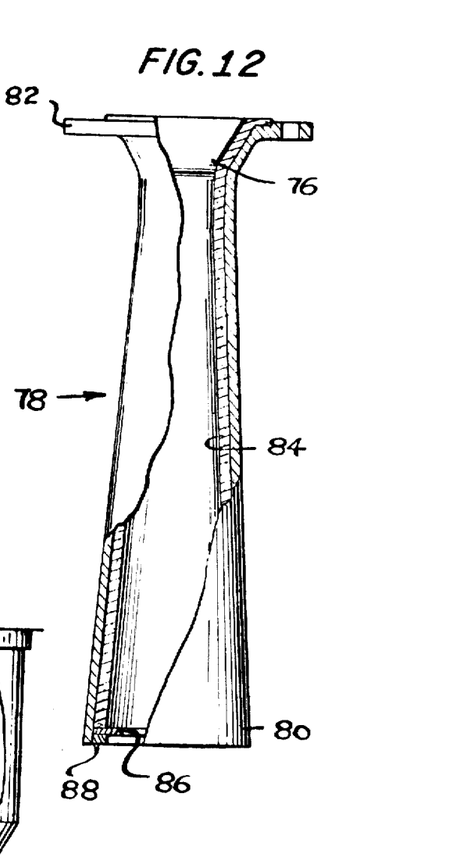
FIG. 12 is a fragmentary section of a Venturi feedhead.
Figure 13:
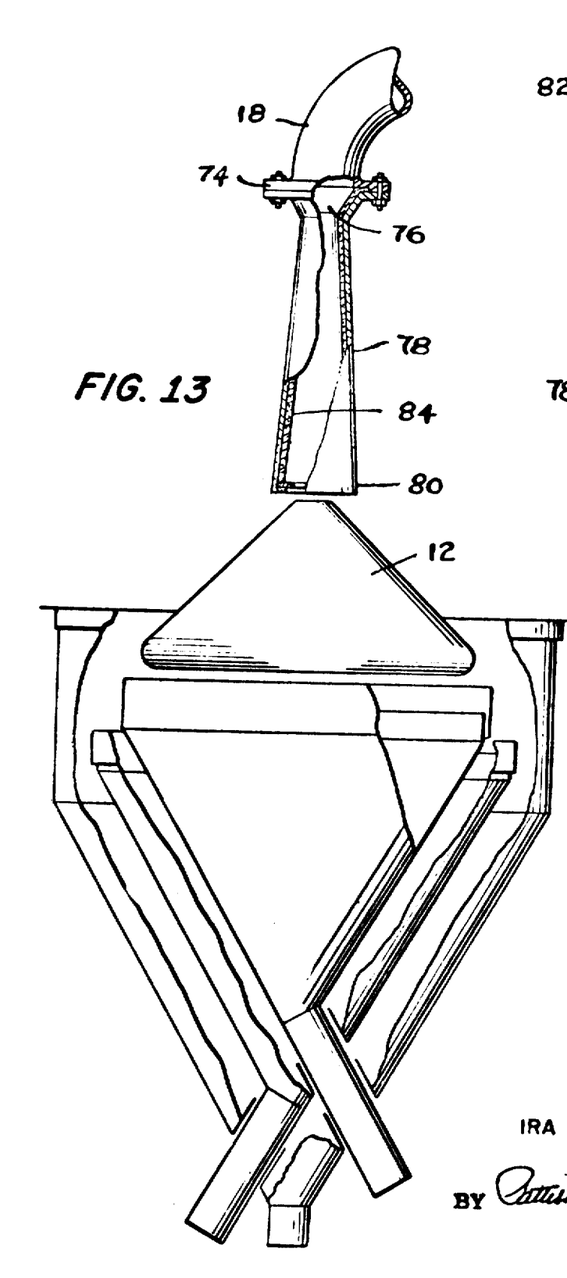
FIG. 13 is an elevation of the Venturi head of FIG. 12 in operable association with the apparatus of FIG. 1.

In FIGS. 12 and 13 there are illustrated an example of a modified head for introducing a stream of slurry downwardly onto and over the curvilinear surface 10 of the separating apparatus to effect the results hereinbefore described in respect to the apparatus of FIGS. 1—3, inclusive.

In this modified form of feedhead, the feed slurry pipe 18, by a flanged connection, 74, communicates with the inlet throat 76 of a Venturi form pipe 78, the outlet end 80 of which is disposed centrally above the upper end or apex portion of the curvilinear surface 10. The inlet end of the Venturi form feedpipe is provided with a flange portion 82 to effect attachment to the flanged slurry feedpipe.

The Venturi feed pipe 78 may be lined throughout the interior thereof with a wear resistant material (i.e. Teflon) 84 and the outlet end is equipped with a removable and replaceable orifice ring 86, held in place by a snap-in retaining ring 88 which permits replacement of the orifice ring to control the outlet orifice diameter and, hence, discharge characteristics of the tube or feedpipe.

By way of example, it has been discovered that a practical working feedpipe to be used would take the dimensions of a 10 inch overall length, a 2 inch diameter inlet throat and a 3 inch diameter outlet throat. The outlet throat diameter is controllable by replacement of the orifice ring 86.

It has been discovered that a Venturi form or effect feedhead serves to equalize distribution of the slurry over the curvilinear surface, control the rate of flow of the slurry into the curved surface, and also serves to mix the particulates in the slurry to a more equal or thorough mixture. Variations in the size of the replaceable orifice ring enable control over the volume or rate of slurry flow emitting from the Venturi pipe.

It has also been discovered that the use of a Venturi pipe or device at intermediate points in the length of the slurry feedline will cause stirring or mixing of the slurry without velocity loss in the feedline to maintain a greater degree of solid particulate suspension in the slurry as it passes to the separating apparatus. Spaced locations of the Venturi effects along the feedline can be determined by the needs for mixing of the slurry along the length of the line.

From the foregoing it should now be readily apparent that I have discovered the unique and advantageous applicability of the Coanda effect, which has been heretofore known and recognized in limited applications to certain hydraulic phenomena and to air currents flowing over aerodynamic surfaces, to the art of sizing and separating solid particulates suspended in a liquid slurry. It should be further apparent that adaption of the Coanda effect to sizing and separating results in the provision of apparatus and methods capable of fabrication, installation and operation at costs and under conditions highly favorable by comparison with like factors of other previously known apparatus and methods utilized for sizing and separating solids.

It should also be apparent from the foregoing that I have discovered the unique and advantageous application of the effect obtainable from a Venturi structure intermediate the length of a slurry supply line for the purpose of maintaining a uniform mixing and suspension of the solid particulates in the slurry without incurring a loss of pressure or rate of flow as would result from the use of various known mixing devices in a feedline. Likewise, it has been made apparent that I have further discovered the unique applicability of a Venturi structure as a feedhead for uniformly dispersing slurry onto or over treating apparatus wherein it is desired that such slurry be entrained upon or into the apparatus with a maximum uniformity of particulate suspension and with a substantially controlled and uniform rate of flow throughout the parameters of the slurry stream.

I further contemplate that the methods and apparatus which I have hereinbefore described and explained are adaptable to many and various modifications in methods and apparatus for separating and sizing particulates. For example, and without intent of limitation, the methods and apparatus herein disclosed would readily lend themselves to sizing of phosphate particulates to be recovered from an aqueous suspension wherein the aqueous feed is supplemented with certain known reagents for agglomeration or benefication purposes. Obviously, the sizing of other minerals having inordinately small fines, such as phosphate, could also be treated by the apparatus with one or another benefication processes supplementing the use of the apparatus herein disclosed.

Having now described my discoveries and inventive applications thereof to the art of sizing and separating solid particulates in operable embodiments and in terms of step by step procedures, what I desire to claim is:

1. Apparatus for separating and separately collecting particulates of different sizes and shapes suspended in a liquid slurry comprising, an inclined surface fixed against movement adapted to receive said slurry at the upper end thereof and including means for carrying the same in a stream of diminishing depth to the lower end thereof, means for substantially continuously introducing said slurry onto the upper end of said inclined surface, a torus forming and defining an integral continuation of the lower end of said inclined surface and passing the stream of slurry continuously thereabout, means for collecting said slurry and fine particulates located substantially vertically beneath the lowermost portion of said torus, and means disposed outwardly from an intermediate portion of said torus for receiving and collecting large particulates discharging from said slurry.

2. Apparatus as defined in claim 1 wherein said first and second recited collecting means each consists of a circular splitter ring disposed substantially concentrically of said curvilinear torus, each said circular splitter ring defining the uppermost edge of a collecting hopper opening vertically there beneath.

3. Apparatus as defined in claim 1 wherein said torus constitutes an integral convex surface continuation of the lower extremity of said inclined surface whereby said slurry adheres to and follows said torus under the influence of the Coanda effect to carry the fine particulates with said stream to the lowermost extremity of said torus while discharging larger particulates from said stream intermediate the length of said convex 4. Apparatus as defined in claim 1 wherein said fixed circular inclined surface takes the form of a cone having a convex torus forming a skirtlike lower extremity continuously about said cone, and wherein a Venturi nozzle is positioned in vertical alignment above the apex axis of said cone for discharge of slurry therethrough on the conical surface.

5. Apparatus as defined in claim 1 wherein a Venturi nozzle is incorporated in the slurry delivery system to produce mixing of said slurry and uniform dispersal of the suspension of the particulates therein.

6. A method of sizing and separating coarse, middling and fine particulates suspended in a liquid slurry comprising, uniformly flowing said slurry in a stream of diminishing depth downwardly and about a convex torus having a vertical axis, collecting coarse particulates outwardly from an intermediate portion of said torus, and collecting middling and fine particulates at positions progressively lower and less distant from said torus.

7. Apparatus for separating and separately collecting particulates of different sizes and shapes suspended in a liquid slurry comprising an inclined surface fixed against movement and having a dimension laterally of the lower end thereof at least as great as the dimension laterally of the upper end thereof, a torus forming and defining an integral continuation of the lower end of said inclined surface and passing the stream of slurry continuously thereabout, means for collecting said slurry and fine particulates located substantially vertically beneath the lowermost portion of said torus, and means disposed outwardly from an intermediate portion of said torus for receiving and collecting large particulates discharging from said slurry.

8. Apparatus for separating and separately collecting particulates of different sizes and shapes suspended in a liquid slurry comprising an inclined surface fixed against movement and adapted to receive a stream of slurry unto the upper end thereof, said inclined surface having a greater width transversely to the direction of stream flow at the lower end than at the upper end to produce a stream of diminishing depth from the upper to the lower end thereof, a torus forming and defining an integral continuation of the lower end of said inclined surface and passing the stream of slurry continuously thereabout, means for collecting said slurry and fine particulates located substantially vertically beneath the lowermost portion of said torus, and means disposed outwardly from an intermediate portion of said torus for receiving and collecting large particulates discharging from said slurry.